(12) United States Patent
Alekseyev et al.

(10) Patent No.: US 8,915,331 B2
(45) Date of Patent: Dec. 23, 2014

(54) BATTERY POWERED, HANDHELD LUBRICATION GUN WITH DISPLAY

(75) Inventors: Viktor Alekseyev, Creve Coeur, MO (US); Canlong He, O'Fallon, MO (US); R. Keith Rohan, Fenton, MO (US); Ling Guo Kong, Suzhou (CN)

(73) Assignee: Lincoln Industrial Corporation, St. Louis, MO (US)

( * ) Notice: Subject to any disclaimer, the term of this patent is extended or adjusted under 35 U.S.C. 154(b) by 420 days.

(21) Appl. No.: 13/248,211

(22) Filed: Sep. 29, 2011

(65) Prior Publication Data

US 2013/0081903 A1   Apr. 4, 2013

(51) Int. Cl.
*F16N 5/00*   (2006.01)
*F16N 13/00*   (2006.01)
*F16N 3/12*   (2006.01)

(52) U.S. Cl.
CPC ....................................... *F16N 3/12* (2013.01)
USPC ....................................................... 184/105.2

(58) Field of Classification Search
USPC ......................................... 184/105.2; 222/37
See application file for complete search history.

(56) References Cited

U.S. PATENT DOCUMENTS

| | | | |
|---|---|---|---|
| 1,339,916 A | 5/1920 | Boe |
| 1,926,399 A | 9/1933 | Nielsen |
| 2,106,217 A | 1/1938 | Johnson |
| 2,331,684 A | 10/1943 | Henningsen |
| 2,497,762 A | 2/1950 | Davis |
| 2,626,085 A | 1/1953 | MacKinnon |
| 2,627,320 A | 2/1953 | Rotter |
| 2,694,508 A | 11/1954 | Petrenchak |
| 2,848,908 A | 8/1958 | Hollis |
| 2,928,574 A | 3/1960 | Wagner |
| 2,966,810 A | 1/1961 | Hayes |
| 3,718,162 A | 2/1973 | Dafler et al. |
| 3,774,476 A | 11/1973 | Sohnlein et al. |
| 3,872,742 A | 3/1975 | States |
| 3,901,104 A | 8/1975 | Sims |
| 3,945,274 A | 3/1976 | Annett, II |
| 4,069,835 A | 1/1978 | Stadler |
| 4,074,591 A | 2/1978 | Dick |
| 4,106,522 A | 8/1978 | Manesse |

(Continued)

FOREIGN PATENT DOCUMENTS

| | | |
|---|---|---|
| CA | 2193139 | 6/1998 |
| CN | 2038185 U | 5/1989 |

(Continued)

OTHER PUBLICATIONS

Extended European Search Report dated Apr. 19, 2006 regarding European Application No. 05111194.6, 4 pages.

(Continued)

*Primary Examiner* — William E Dondero
*Assistant Examiner* — Mark K Buse
(74) *Attorney, Agent, or Firm* — Senniger Powers LLP

(57) ABSTRACT

A battery-powered, handheld grease gun for dispensing lubricant. A pump mechanism driven by a motor is in communication with the lubricant and has a supply port for dispensing the lubricant at a lubrication point. A sensor monitors the pump mechanism of the motor. A display displays information indicative of the monitored condition of the device, such as volume of lubricant dispensed. A processor responsive to operator input selectively energizes the motor to drive the pump mechanism to dispense lubricant.

20 Claims, 10 Drawing Sheets

(56) References Cited

U.S. PATENT DOCUMENTS

| | | | |
|---|---|---|---|
| 4,168,787 A | 9/1979 | Stamper | |
| 4,215,594 A | 8/1980 | Workman, Jr. et al. | |
| D257,213 S | 10/1980 | Wegmann et al. | |
| 4,257,540 A * | 3/1981 | Wegmann et al. | 222/262 |
| 4,366,871 A | 1/1983 | Dieterle et al. | |
| 4,592,251 A | 6/1986 | Mason | |
| 4,664,298 A | 5/1987 | Shew | |
| 4,710,071 A | 12/1987 | Koehler et al. | |
| 4,718,824 A | 1/1988 | Cholet et al. | |
| 4,757,598 A | 7/1988 | Redman | |
| 4,763,814 A * | 8/1988 | Haruyama et al. | 222/63 |
| 4,770,613 A | 9/1988 | Hoover et al. | |
| 4,791,833 A | 12/1988 | Sakai et al. | |
| 4,834,192 A | 5/1989 | Hansson | |
| 4,892,013 A | 1/1990 | Satoh | |
| 4,898,249 A | 2/1990 | Ohmori | |
| 5,011,341 A | 4/1991 | DeGroff | |
| 5,022,556 A | 6/1991 | Dency et al. | |
| 5,027,984 A | 7/1991 | Gakhar et al. | |
| 5,038,892 A | 8/1991 | Maloney | |
| 5,083,990 A | 1/1992 | Rahm | |
| 5,105,912 A | 4/1992 | Heister | |
| 5,269,733 A | 12/1993 | Anthony, III | |
| 5,277,339 A | 1/1994 | Shew et al. | |
| 5,289,743 A | 3/1994 | Cirami | |
| 5,309,080 A * | 5/1994 | Odendahl et al. | 320/150 |
| 5,339,908 A | 8/1994 | Yokota et al. | |
| 5,404,966 A * | 4/1995 | Yang | 184/39 |
| 5,404,967 A | 4/1995 | Barry | |
| 5,489,834 A * | 2/1996 | Pitkanen | 320/106 |
| 5,550,416 A | 8/1996 | Fanchang et al. | |
| 5,556,009 A | 9/1996 | Motzko | |
| 5,565,770 A * | 10/1996 | Jones | 324/207.24 |
| 5,609,274 A | 3/1997 | Shih et al. | |
| 5,624,000 A | 4/1997 | Miller | |
| 5,692,575 A | 12/1997 | Hellstrom | |
| 5,713,723 A | 2/1998 | Hathaway | |
| 5,730,232 A | 3/1998 | Mixer | |
| 5,775,539 A | 7/1998 | Bates et al. | |
| D409,059 S | 5/1999 | Wilson et al. | |
| 5,909,830 A | 6/1999 | Bates et al. | |
| 5,945,803 A * | 8/1999 | Brotto et al. | 320/106 |
| 6,086,502 A | 7/2000 | Chung | |
| 6,093,130 A | 7/2000 | Buck et al. | |
| 6,102,632 A | 8/2000 | Potter et al. | |
| 6,125,642 A * | 10/2000 | Seener et al. | 62/193 |
| 6,135,327 A * | 10/2000 | Post et al. | 222/333 |
| 6,142,242 A | 11/2000 | Okumura et al. | |
| 6,161,723 A | 12/2000 | Cline et al. | |
| 6,244,387 B1 * | 6/2001 | Paluncic et al. | 184/37 |
| 6,251,040 B1 | 6/2001 | Safont et al. | |
| 6,296,427 B1 | 10/2001 | Potter et al. | |
| 6,408,985 B1 * | 6/2002 | Orlitzky et al. | 184/37 |
| 6,431,289 B1 | 8/2002 | Potter et al. | |
| 6,458,058 B1 | 10/2002 | Fu | |
| 6,461,088 B2 | 10/2002 | Potter et al. | |
| 6,585,009 B2 * | 7/2003 | Matthews et al. | 141/67 |
| 6,585,620 B1 | 7/2003 | Bae | |
| 6,729,414 B2 | 5/2004 | Cooper et al. | |
| 6,733,414 B2 | 5/2004 | Elger | |
| 6,793,042 B2 | 9/2004 | Brouillet | |
| 6,834,781 B1 * | 12/2004 | Mueller | 222/262 |
| 7,004,357 B2 * | 2/2006 | Shew | 222/256 |
| 7,032,713 B2 * | 4/2006 | Huang et al. | 184/105.2 |
| 7,152,712 B2 * | 12/2006 | Gisler et al. | 184/53 |
| 7,228,941 B2 * | 6/2007 | Weigand et al. | 184/7.4 |
| 7,267,198 B2 * | 9/2007 | Cen | 184/105.2 |
| 7,392,882 B2 * | 7/2008 | Chen | 184/105.3 |
| 7,508,225 B2 * | 3/2009 | Taylor | 324/721 |
| 7,523,843 B2 * | 4/2009 | Shew et al. | 222/262 |
| 7,594,622 B2 * | 9/2009 | Witt et al. | 242/563.2 |
| 7,628,293 B2 * | 12/2009 | Urata et al. | 222/58 |
| 7,970,558 B1 * | 6/2011 | Roys | 702/46 |
| 8,210,318 B2 * | 7/2012 | Frowiss et al. | 184/26 |
| 8,212,530 B2 * | 7/2012 | Shen et al. | 320/150 |
| 8,528,782 B2 * | 9/2013 | Mergener et al. | 222/37 |
| 2001/0031179 A1 | 10/2001 | Potter et al. | |
| 2002/0094907 A1 | 7/2002 | Elger | |
| 2002/0157901 A1 | 10/2002 | Kast et al. | |
| 2003/0181283 A1 | 9/2003 | Chen | |
| 2004/0198547 A1 | 10/2004 | Eisenhardt | |
| 2004/0211576 A1 | 10/2004 | Milbourne et al. | |
| 2005/0180870 A1 | 8/2005 | Stanley et al. | |
| 2006/0060426 A1 * | 3/2006 | Chen | 184/105.2 |
| 2006/0070812 A1 | 4/2006 | Eggleton | |
| 2006/0108180 A1 * | 5/2006 | Grach et al. | 184/105.2 |
| 2007/0137942 A1 * | 6/2007 | Weems et al. | 184/105.2 |
| 2008/0017452 A1 * | 1/2008 | Chen | 184/105.2 |
| 2008/0240944 A1 | 10/2008 | Arens | |
| 2009/0321101 A1 * | 12/2009 | Furusawa et al. | 173/162.2 |
| 2010/0001017 A1 * | 1/2010 | Herman et al. | 222/1 |
| 2011/0058356 A1 * | 3/2011 | Friedman et al. | 362/119 |
| 2011/0253402 A1 * | 10/2011 | Aradachi et al. | 173/46 |
| 2012/0055951 A1 * | 3/2012 | Herman et al. | 222/1 |
| 2013/0081903 A1 * | 4/2013 | Alekseyev et al. | 184/26 |

FOREIGN PATENT DOCUMENTS

| | | |
|---|---|---|
| CN | 2101166 U | 4/1992 |
| DE | 9412699 U1 | 12/1995 |
| DE | 19623537 A1 | 12/1997 |
| DE | 19941894 A1 | 4/2001 |
| EP | 0 302 229 A2 | 2/1989 |
| EP | 1 666 786 A1 | 6/2006 |
| GB | 2205905 A | 12/1988 |
| GB | 2 396 390 A | 6/2004 |
| WO | 91/13691 | 9/1991 |
| WO | 92/09406 | 6/1992 |
| WO | 03/042576 A1 | 5/2003 |

OTHER PUBLICATIONS

International Search Report regarding corresponding PCT/US2013/030464, dated Sep. 27, 2013, 4 pages.

Written Opinion of the International Searching Authority, PCT/2013/030464, dated Sep. 27, 2013, 7 pages.

* cited by examiner

BATTERY POWERED, HANDHELD LUBRICATION GUN WITH DISPLAY

BACKGROUND OF THE INVENTION

The present invention generally relates to handheld devices for dispensing lubrication and, in particular, an improved handheld gun having a display indicating one or more parameters of the gun and its operation, including an indication of the volume of lubricant dispensed by the gun.

Handheld powered lubricators, commonly referred to as "grease guns," have widespread use for servicing bearings and other components of vehicles, farming equipment, and industrial machines. A grease gun typically includes a pump having a reciprocal plunger, a reservoir of grease, a discharge hose, and an electric motor which drives the pump. The motor is powered through an electrical cord or, for a cordless grease gun, by a battery. The grease gun discharges lubricant generally at a uniform pressure and volumetric output rate. A grease gun of this type is shown in United States Patent Application 20060108180, which is hereby incorporated by reference in its entirety.

Periodically, there is a need to dispense a particular amount of lubricant from a grease gun to a grease fitting. One drawback is that grease guns can be operated inefficiently and an operator is unsure of the quantity of lubricant dispensed. Because there is no visual indication of the number of pump cycles (i.e., reciprocations of the plunger), the operator must estimate whether a correct quantity of grease has been dispensed to a fitting. Often, the operator misjudges and a bearing is either under or over-lubricated, which is detrimental to operation and durability. The grease gun is also prone to damage should the motor overheat, such as due to a clogged fitting or an over-pressure condition inside the pump.

There is also a need to know how much lubricant is available in a reservoir of a grease gun so that the operator does not run out of lubricant.

SUMMARY

In one form, the invention comprises a battery-powered, handheld device for dispensing lubricant in a reservoir at a lubrication point. A pump mechanism is in communication with the lubricant in the reservoir and has a supply port for dispensing the lubricant at the lubrication point. An electric motor drives the pump mechanism to dispense the lubricant. A sensor monitors the pump mechanism or the electric motor, generating a condition signal indicative of the operation of the monitored pump mechanism and/or the monitored electric motor. A display displays information indicative of the monitored condition of the device, such as volume of lubricant dispensed. A processor responsive to operator input selectively energizes the electric motor to drive the pump mechanism to dispense lubricant at the outlet of the pump mechanism.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
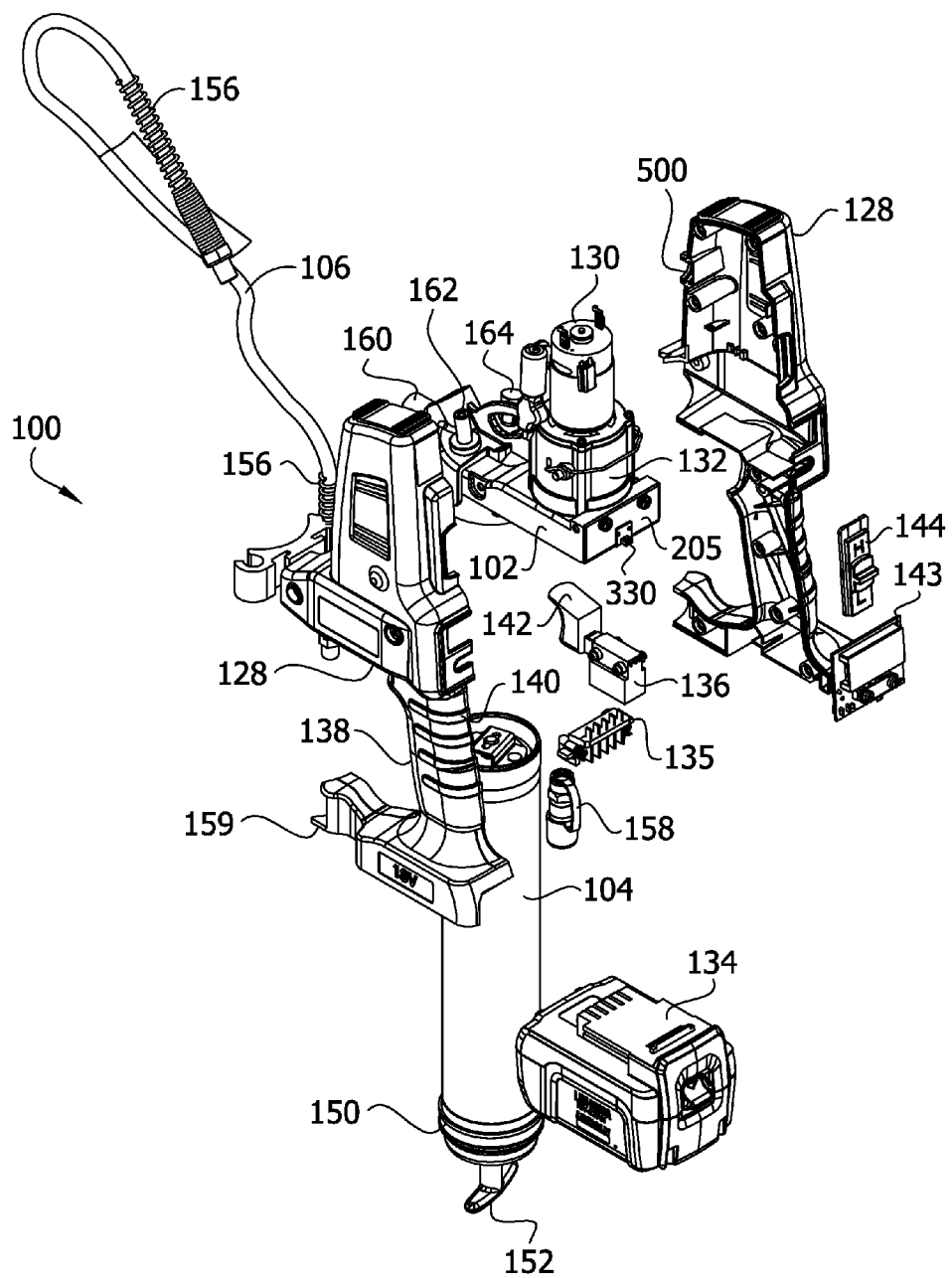
FIG. 1 is an exploded perspective illustration of one embodiment of the lubrication gun of the invention.

Referring now to the drawings and in particular to FIG. 1, which is an exploded perspective illustration of a lubrication gun, one embodiment of a device for dispensing a viscous fluid according to the present invention is indicated generally at 100. In the embodiment shown in the drawings, the device is a portable and handheld grease gun for dispensing a lubricating grease, although other embodiments do not depart from the scope of the invention. The grease gun 100 includes a pump mechanism, indicated generally at 102, in communication with lubricant from a reservoir 104 and which dispenses lubricant from the reservoir 104 through a supply port such as a flexible hose 106 to machinery or vehicles which require lubrication.

As shown in FIG. 1, the grease gun 100 has a housing 128 which contains the pump mechanism 102, including a transmission assembly 132. An electric motor 130 for driving the pump mechanism 102 is positioned in the housing 128 generally above the pump 102, with a battery 134 and electric trigger switch 136 positioned in the housing generally below the pump. The rotary motion of the motor 130 is converted into a reciprocating motion of a plunger using a yoke mechanism. The pump mechanism 102 includes a positive displacement, single action pump. (See United States Patent Application 20060108180, which is hereby incorporated by reference in its entirety.)

In one embodiment, the housing 128 has a unitary clamshell structure of molded plastic with two lateral halves held together by several fasteners (not shown). A lower portion of the housing defines a tubular handle 138 sized for gripping to enable an operator to grasp and hold the grease gun in one hand. One or more pads 140 of a suitable soft material cover the handle 138 to improve comfort and friction. A trigger 142 is positioned on the housing 128 where it is readily engaged by the index finger of the operator for moving the trigger and thereby opening or closing the switch 136 to activate or de-activate the motor 130. A mechanical selector switch 144 selects low or high speed gearing of the transmission assembly 132.

An electrical circuit interconnects a battery connector 135 for engaging the battery 134, the motor 130, the trigger switch 136, and a printed circuit board 143. In one embodiment, the battery 134 is a lithium ion battery having a potential of between 12 and 18 volts, and may be rechargeable. Other component arrangements do not depart from the scope of this invention. For example, the motor and/or transmission may be positioned in the lower portion of the housing, or horizontally adjacent to the pump.

In one embodiment, the reservoir 104 has a cylindrical shape and comprises a replaceable lubricant cartridge with a spring-driven diaphragm (not shown) for urging lubricant upward in the reservoir toward the pump 22. One or more vent passages (not shown) are provided above the reservoir 104 for venting the reservoir to atmospheric pressure. A lower end of the reservoir 104 has a threaded end member or cap 150 with a downwardly extending handle 152. The reservoir 104 is removable for refilling by replacing an empty lubricant cartridge with a full one. Other types of reservoirs are also suitable.

The discharge spout 106 comprises a length of flexible hose having at each end a coil 156 of a metal surrounding the hose to prevent kinks. A coupler 158 is attached to an end of the hose 106 for sealingly engaging a fitting to lubricate a bearing or other component of machinery. A holder 159 is provided to secure the hose 106 adjacent to the reservoir 104 when the grease gun is not in use. A pressure relief valve 160 prevents an over-pressure condition which could damage the grease gun 100 or become a safety hazard. The valve 160 is received in a cavity of a block of the pump mechanism 102 and communicates with an output port of the pump mechanism. It is factory set (e.g., at 7000 psi) to relieve excess pressure. A bulk valve 162 in communication with and for refilling the reservoir is also provided. A vent valve 164 is also provided to allow the operator to vent pressure built up within the pump mechanism.

Figure 2:
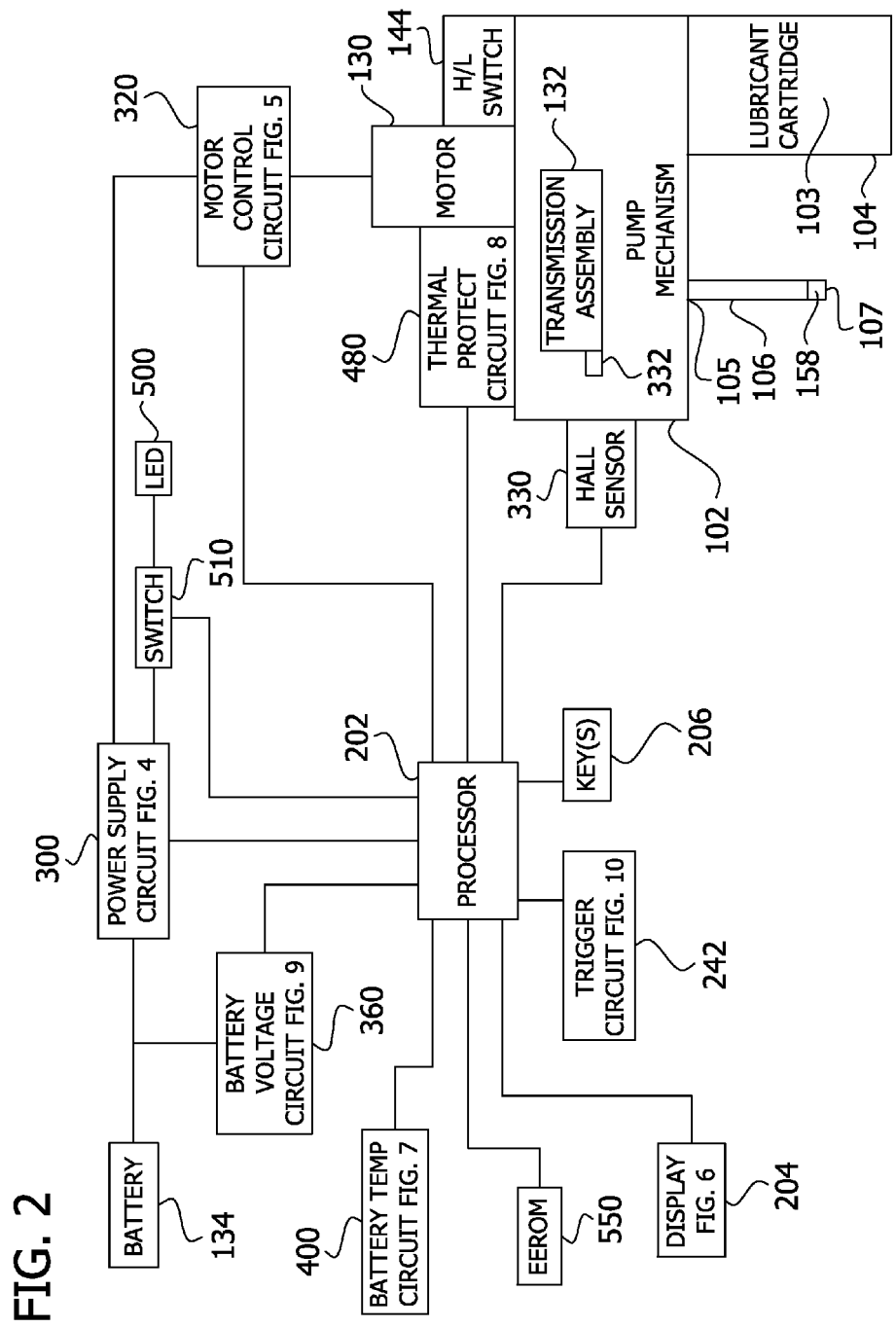
FIG. 2 is a block diagram of one embodiment of the lubrication gun of the invention.

FIG. 2 is a block diagram of one embodiment of the lubrication gun of the invention. In particular, FIG. 2 illustrates a grease gun device 200 for use with the battery 134 and the reservoir 104 for dispensing lubricant 103 in the reservoir 104 at a lubrication point 107. As illustrated in FIG. 1, it is contemplated that the gun 200 comprise a handheld housing enclosing in a unitary structure the pump mechanism 102 including transmission assembly 132, the electric motor 130, at least one sensor for sensing a condition of the gun 200, a processor 202, a display 204 and an input device such as one or more keys 206 connected to the processor.

The pump mechanism 102 is in communication with the lubricant 103 in the reservoir 104 and has a supply port 105 for dispensing the lubricant 103 at the lubrication point 107 at the coupler 158 of the hose 106. The electric motor 130 drives the pump mechanism 102 to dispense the lubricant 103.

Figure 4:
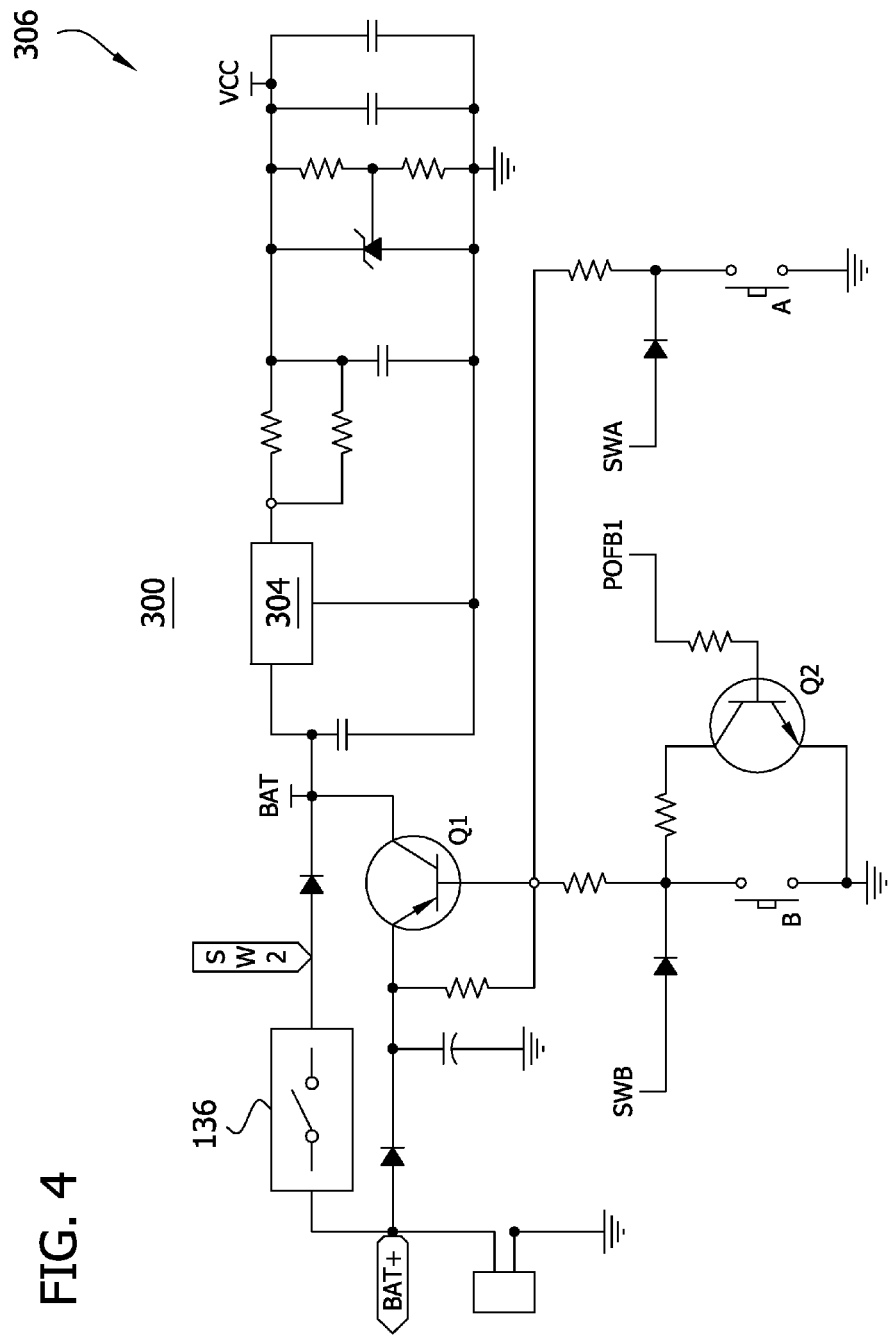
FIG. 4 is a schematic diagram of one embodiment of the power supply of a lubrication gun of the invention.

A power supply circuit 300, shown in more detail in FIG. 4, connects to the battery 134 for converting the battery voltage to the various voltages needed for the device 200. The circuit includes trigger switch 136 permitting the operator selectively activate the device 200 by depressing trigger 142. A voltage regulator 304 (e.g., LM78LXX series sold by National Semiconductor) regulates the voltage provided by the battery, which voltage is conditioned by an array 306 of resistors, capacitors and a zener diode to generate a VCC voltage. Switches A and B correspond to keys 206 for use by an operator to provide input to the processor 202. Closing switches A and B generates signals SWA and SWB, respectively, provided to the processor 202. Terminal POFB1 is connected to an output pin of the processor 202 which provides a signal to close switch Q2 in order to close switch Q1 to power up the device 300 when switch B is closed. Powering up the device by closing switch B allows the user the program the processor, as noted herein. When switch B is depressed, signal SWB is provided to the processor which then provides signal POFB1 to close switch Q2 to close switch Q1 to fully energize the circuit 300. Similarly, when switch A is depressed, signal SWA is provided to the processor and a voltage is applied to the base of switch Q1 to close switch Q1 to energize the circuit 300. Without further activity, the processor 202 will maintain an active and energized state for a period of time (e.g., 30 seconds) and then the processor de-energizes circuit 300 by opening switch Q1. In one embodiment, the processor may be an MC71PD408 sold by Abov Semiconductor.

Figure 5:
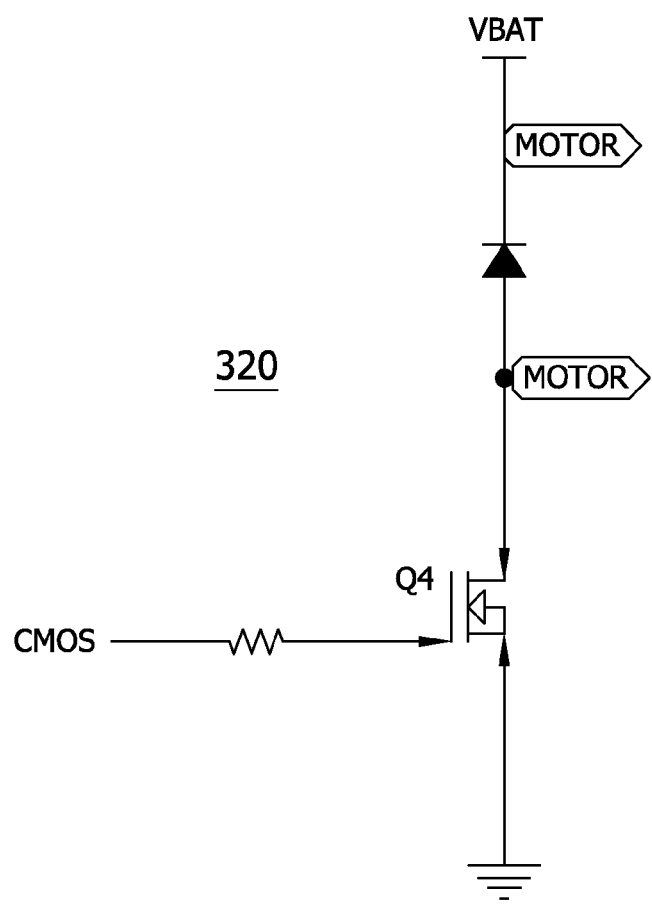
FIG. 5 is a schematic diagram of one embodiment of the motor control circuit of a lubrication gun of the invention.

FIG. 5 is a schematic diagram of one embodiment of the motor control circuit 320 controlled by the processor 202 to selectively energize the motor 130. A base terminal CMOS of the CMOS switch Q4 is connected to an output terminal of the processor 202. The processor 202 applies a signal to the terminal CMOS to close switch Q4. This grounds one of the motor inputs to energize the motor to drive the pump mechanism to pump the lubricant 103.

As noted above, the device includes at least one sensor configured to monitor at least one of the pump mechanism and the electric motor. The sensor generates a condition signal indicative of the operation of the monitored pump mechanism 102 and/or the monitored electric motor 130. In one embodiment, the sensor monitors operation of the pump mechanism 102 to indicate a volume of lubricant 103 dispensed by the pump mechanism 102. In response to the sensor, the processor 202 controls the display 204 to indicate the volume of lubricant 103 dispensed by the pump mechanism.

Figure 3:
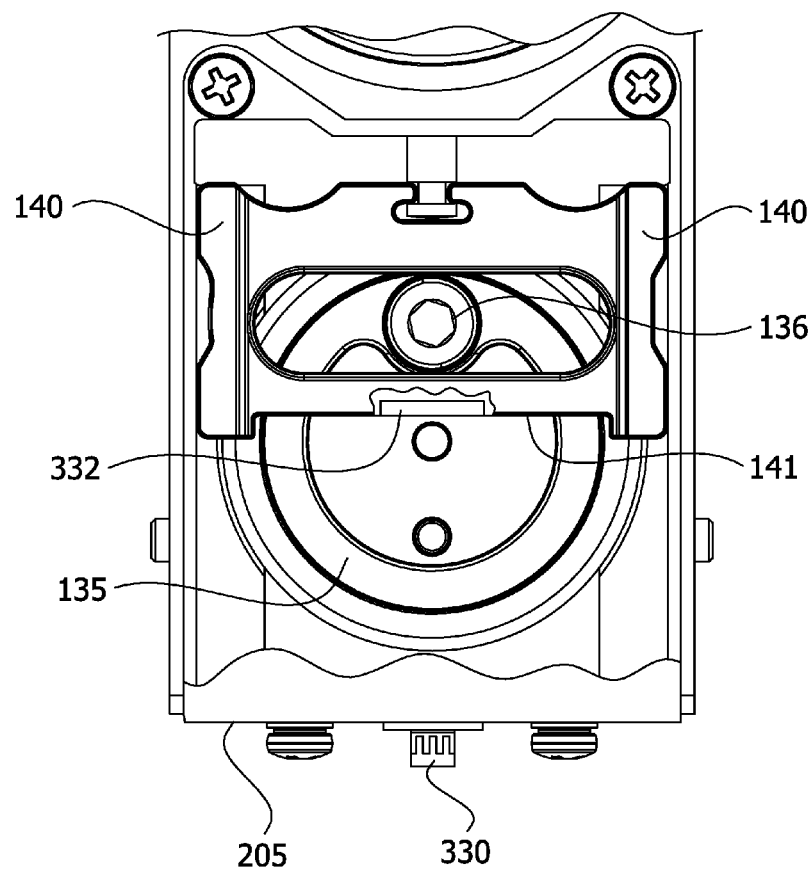
FIG. 3 is a partial, bottom view of the pump mechanism with the bottom panel removed.

In particular, the sensor may be a Hall sensor 330 positioned on the pump mechanism 102 for sensing a magnet 332 on a moving member of the pump mechanism. For example, for a three stage planetary gear transmission assembly 132, the moving member may be a yoke 140 as illustrated in FIG. 3 (see also FIG. 17 of United States Patent Application 20060108180; see also U.S. Pat. No. 6,135,327 incorporated herein by reference in its entirety). FIG. 3 is a partial, bottom view of the pump mechanism 102 with part of the bottom panel 205 removed.

The magnet 332 is positioned on a vertical surface 141 of the yoke 140 opposite the Hall sensor 330. A drive pin 136 with a cylindrical bushing extends from a final driver 135, the pin being offset from a center of rotation of the final driver 135. The drive pin 136 is slidably received in an oblong slot 138 of a yoke 140 which reciprocates the yoke 140 as the final driver 135 rotates. The Hall sensor 330 is positioned opposite the magnet 332 on the vertical edge of the bottom panel 205.

Each time the final driver 135 completes a full 360° of rotation, the rotary motion of the final driver 135 102 is converted into reciprocating motion of a plunger which dispenses a certain, known volume of lubricant 102. Each time the final driver 135 completes a full 360° of rotation, the yoke 140 moves linearly toward and away from the Hall sensor 330. When the magnet 332 is close to the Hall sensor 330 (e.g., several millimeters), the magnet 332 activates the Hall sensor 330 to generate the Hall signal. The Hall sensor 330 provides a Hall signal indicative of movement of the plunger of the pump mechanism 102 and indicative of dispensing of the certain volume of lubricant 102. In this embodiment, the condition signal comprises the Hall signal and the processor 202 responds to the signal and controls the display. A visual image generated by the display 204 indicates to the operator the volume of lubricant 103 dispensed by the pump mechanism 102.

Alternatively or in addition, the operator may use the input device 206 to program the processor with information indicative of the volume of lubricant in the reservoir. In response, the processor 202 keeps track of the amount of lubricant dispensed. The processor controls the display 204 so the visual image indicates to the operator the volume of lubricant remaining in the reservoir after lubricant is dispensed by the pump mechanism.

Figure 6:
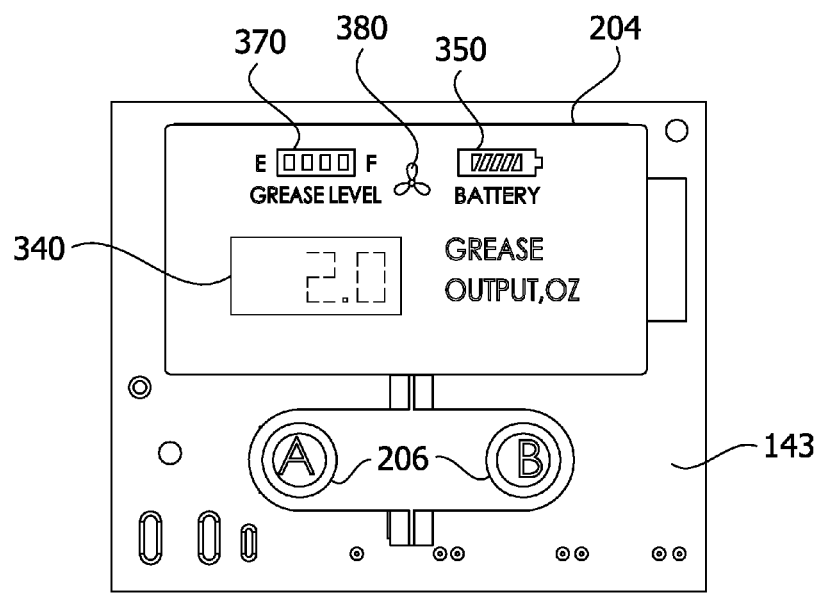
FIG. 6 is a front elevation illustration of one embodiment of the display and input device of a lubrication gun of the invention.

The display 204, illustrated in more detail in FIG. 6, is connected to the processor 202, controlled by the processor and configured to display the above-noted information indicative of the operation of the device 200. In particular, the display includes a dispensed grease indicator area 340 with numerals providing a visual image of the grease output in ounces since the last reset of the display by the operator. As illustrated, the display 204 may have alphanumeric characters "GREASE OUTPUT, OZ" to label the dispensed grease indicator area 340. In addition, an operator may use keys 206 to change the area 340 to indicate the accumulated total volume of lubricant dispensed from the reservoir 104 and/or the amount of lubricant remaining in the reservoir 104.

Alternatively or in addition, the display 204 may include a battery icon 350 indicating the remaining battery power available (i.e., the charged level of the battery). The processor 202 determines the remaining battery power available by monitoring a battery voltage circuit 360, described below. Alternatively or in addition, the display 204 may include a volume level icon 370 indicating the volume of lubricant 103 remaining in the reservoir 104. Alternatively or in addition, the display may include an icon 380, which may be animated, and which would be presented and animated when the motor is energized and lubricant is being dispensed.

In one embodiment, the display is an LCD display backlit by one or more light sources such as LEDs (light emitting diodes). For example, the LCD display may be backlit by a green LED during normal operation of the device and may be backlit by a red LED when the device is not operable because of low battery voltage, because of excessive battery temperature (as sensed by the battery temperature circuit noted below regarding FIG. 6) and/or because of excessive motor temperature (as sensed by the thermal protection circuit noted below regarding FIG. 7). Thus, the display 204 would optionally include a red light source configured to backlight the display 204. The processor 202 is configured to energize the red light source in the event of at least one of the following: a battery voltage below a minimum, a battery temperature above a maximum and a motor temperature above a maximum.

As noted above, the processor 202 illustrated in FIG. 2 is responsive to operator input for controlling the motor control circuit 320 to selectively energize the electric motor 130 to drive the pump mechanism 102 to dispense lubricant at the outlet 105 of the pump mechanism. The operator input includes a trigger signal from the trigger switch 136 as detected by a trigger circuit 242 (see FIG. 9) for energizing the motor 128.

The processor 202 is also connected to the Hall sensor 330 for receiving the Hall sensor signal. In particular, the processor is responsive to the Hall sensor signal for selectively energizing the electric motor 130 and for controlling the display 204. The display 204 provides to the operator one or more of the following: a visual image of numerals corresponding to the amount of dispensed lubricant, an indication of the battery power remaining (e.g., an icon), an indication of the amount of lubricant remaining in the reservoir (e.g., an icon), a visual image of numerals corresponding to the accumulated total amount of lubricant dispensed from a cartridge, and/or an animated icon indicating that lubricant is being dispensed.

Figure 7:
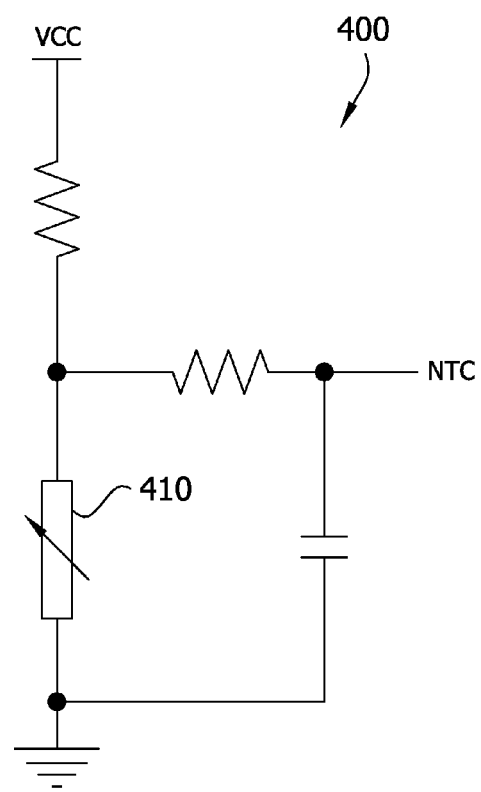
FIG. 7 is a schematic diagram of one embodiment of the battery temperature sensing circuit of a lubrication gun of the invention.

In one embodiment, the device 100 includes a battery temperature circuit 400 as illustrated in FIG. 7 for providing a battery temperature signal indicative of a temperature of the battery. The battery temperature circuit 400 has an output NTC connected to the processor 202 providing a voltage signal reflective of the temperature of the battery 134. In particular, the battery temperature circuit 400 includes a thermistor 410 positioned adjacent the battery 134 so that its temperature corresponds to the battery temperature. Thermistor 410 has a resistance which varies inversely with temperature so that the NTC (negative temperature coefficient) output signal varies inversely with the temperature of the battery. The processor is configured to energize the electric motor 130 to drive the pump mechanism 102 to dispense lubricant 103 at the outlet 105 of the pump mechanism only when the battery temperature signal NTC indicates that the temperature of the battery is below a maximum temperature (e.g., 100° F.). In one embodiment, the thermistor 410 is located within a battery pack including the battery 134 and is connected to the battery temperature circuit 400 via connector 135.

Figure 8:
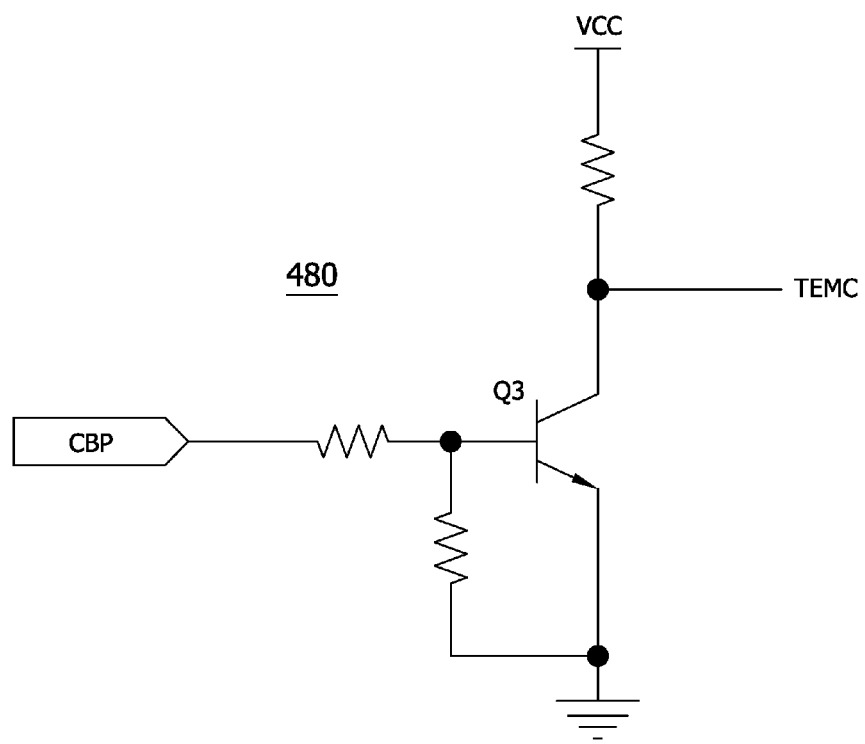
FIG. 8 is a schematic diagram of one embodiment of the thermal protection circuit of a lubrication gun of the invention.

FIG. 8 is a schematic diagram of one embodiment of a thermal protection circuit 480 of the gun 100. Terminal TEMC is connected to an input to the processor 202 to indicate the temperature of the motor 130. Terminal CBP is connected to a thermal protector, such as a bi-metal snap action disk (not shown), on or adjacent the motor 130, for sensing the temperature of the motor 130. In the event of excessive resistance of the pump mechanism, the motor 130 begins to increase in temperature and could overheat. The bi-metal snap action disk is configured to snap closing a circuit which closes switch Q3 providing a shutdown signal to the processor 202 via terminal TEMC. The shutdown signal is provided when the disk temperature (which corresponds to the motor temperature) is above a preset temperature. In response, the processor 202 is programmed to disable operation of the motor 130 by opening switch Q4 of the motor control circuit 320 (see FIG. 4). The processor disables the motor 130 for a preset period of time and/or until the operator resets the processor.

Figure 9:
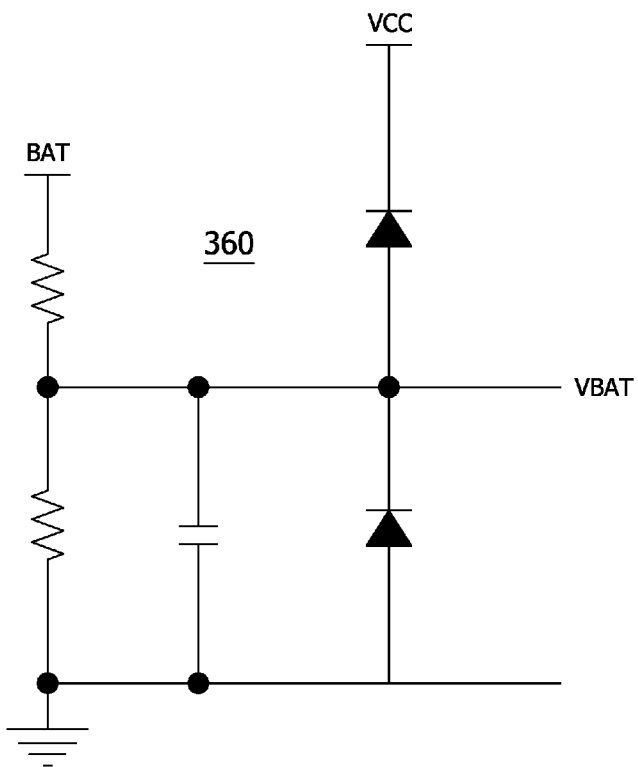
FIG. 9 is a schematic diagram of one embodiment of the battery voltage sensing circuit of a lubrication gun of the invention.

In one embodiment, the device 100 includes a battery voltage circuit 360 shown in FIG. 9 for providing a battery voltage signal VBAT indicative of a voltage of the battery. A resistor divider compares the battery voltage (BAT) to a reference voltage (VCC). The output signal VBAT of the battery voltage circuit 360 is connected to an input to the processor 202. The processor 202 is configured to energize the electric motor 130 to drive the pump mechanism 102 to dispense lubricant at the outlet of the pump mechanism only when the battery voltage signal VBAT indicates that the voltage of the battery is above a minimum voltage (e.g., 16v). Thus, circuit 360 prevents over-discharging of the battery 134. The battery 134 may also include a circuit which prevents over-discharging as well as over-charging.

Figure 10:
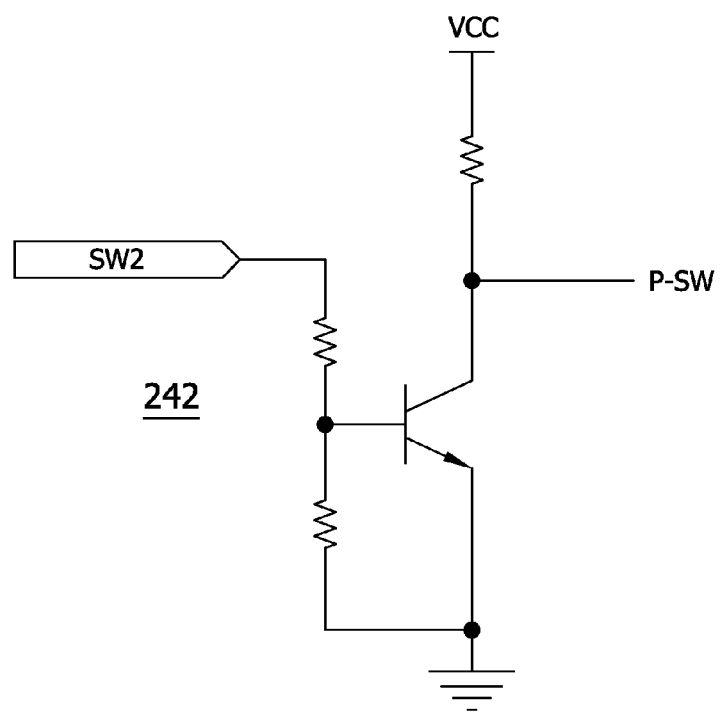
FIG. 10 is a schematic diagram of one embodiment of the trigger circuit of a lubrication gun of the invention.

FIG. 10 is a schematic diagram of one embodiment of a trigger circuit 242 of the gun 100 for detecting the status of the trigger switch 136. Terminal SW2 is connected after switch 136 (see FIG. 3) for detecting that switch 136 has been closed by the operator by depressing the trigger 142. Once switch 142 is closed, the voltage signal on SW2 goes high which closes or turns ON switch Q2 (see FIG. 3). The voltage signal at terminal P-SW is connected to an input to the processor 202 and goes from high to low to indicate to the processor that switch 142 has been closed by the operator. In response, the CMOS output of the processor 202 goes high to turn ON or close switch Q4 and energize the motor 130.

Referring to FIG. 2, the gun 100 may optionally include a light source such as an LED (light emitting diode) 500 for illuminating the lubrication point. The LED 500 is selectively energized by the processor 202 via an electronic switch 510. As shown in FIG. 1, the LED 500 is located below a portion of the housing 128 enclosing the motor 130 and pump mechanism 102 to illuminate lubrication point 107. The processor may energize the LED whenever the trigger 142 is depressed and/or whenever the display 204 is energized.

The following are examples of the use of switches A and B to signal the processor 202 to control the display 204. To turn the display 204 ON and to turn the LED 500 ON, either switch A or B may be depressed and closed or the trigger 142 may be gently or briefly depressed. To turn the display 204 OFF and to turn the LED 500 OFF, switch B may be depressed for 3 seconds or the processor will turn OFF the display and LED 30 seconds after an idle time during which there is no operator interaction with the gun 100.

Some manufacturers recommend the exact amount of grease needed to lubricate a critical bearing. To dispense a desired amount of grease, switch A is depressed for 3 seconds to set display readings of area 340 to zero. Next, the trigger 142 is depressed by the operator to activate the gun 100 and pump lubricant. As lubricant is dispensed, the processor 202 determines the volume dispensed as indicated by the Hall signal and increments the numerals in the dispensed grease indicator area 340. The operator continues to depress the trigger and dispense lubricant until the display indicates the desired amount of grease has been dispensed, at which point the operator releases the trigger. The dispensed grease indicator area 340 displays the amount of grease that has been dispensed.

To see the total accumulated grease output since the cartridge was replaced, switch B is depressed for 1 second by the operator. To reset the dispensed grease indicator area 340 and the volume level icon 370 of the display 204 after a cartridge is replaced or the reservoir refilled, the pump mechanism 102 is initially primed. Switches A and B are simultaneously depressed to clear the display and reset the memory. Next, switch A is depressed for one second to reset the volume level icon 370 to indicate that the grease level in the reservoir is full.

A non-volatile flash memory chip, such as a two-wire serial EEPROM 550 sold by Atmel (e.g., AT24C01) may be connected to the processor 202 to save the display information. The processor 202 stores the information being displayed on the display 204 in the EEPROM 550. When the operator replaces the battery 134, which de-energizes and resets the processor 202, the processor 202 accesses the EEPROM 550 and displays the information stored the in EEPROM 550. As a result, replacing the battery 134 does not interrupt display readings presented by the dispensed grease indicator area 340 and the grease volume level icon 370.

In one embodiment, the operator uses the keys 206 to set the display 204 to indicate a desired amount of grease to be dispensed. When the gun 100 is energized by depressing the trigger 142, the processor 202 energizes the motor 130 and decrements the display 204 to reflect the volume of grease being dispensed. When the desired amount of grease is dispensed and the display reads zero, the processor 202 shuts off of the motor 130 to discontinue its operation indicating that the desired amount of grease has been dispensed.

Optionally, a shunt resistor (not shown) may be added between the switch Q4 and the motor terminal connection of FIG. 4 to monitor the current being applied the motor 130. In this optional embodiment, a processor input would be connected to the shunt resistor and the processor would compare the voltage at the shunt resistor to a reference which represents a maximum motor current. In the event that the voltage at the shunt resistor indicates that the motor current is above the maximum, the processor would discontinue motor operation by disabling the motor control circuit 320 for a preset period of time and/or until the operator resets the processor.

The above summary is provided to introduce a selection of concepts in simplified form that are further described above in the Detailed Description. The summary is not intended to identify key features or essential features of the claimed subject matter, nor is it intended to be used as an aid in determining the scope of the claimed subject matter.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, processor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or processors may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The Abstract and summary are provided to help the reader quickly ascertain the nature of the technical disclosure. They are submitted with the understanding that they will not be used to interpret or limit the scope or meaning of the claims.

What is claimed is:

1. A device for use with a battery and a cartridge of lubricant, said device for dispensing the lubricant in the cartridge at a lubrication point, said device comprising:

a handheld housing enclosing the following in a unitary structure:

a pump mechanism configured for communication with the lubricant in the cartridge and having a supply port for dispensing the lubricant at the lubrication point;

an electric motor for driving the pump mechanism to dispense the lubricant;

a power supply for connection to the battery;

a sensor configured to monitor at least one of the pump mechanism and the electric motor, said sensor generating a condition signal indicative of the operation of the monitored pump mechanism and/or the monitored electric motor;

a display configured to display information indicative of the monitored condition of the device;

a processor responsive to operator input for controlling the power supply to selectively energize the electric motor to drive the pump mechanism to dispense lubricant at the outlet of the pump mechanism, said processor connected to the display, said processor connected to the sensor for receiving the conditional signal and responsive to the condition signal for selectively energizing the electric motor and for controlling the display to provide a visual image to the operator corresponding to the condition signal;

an input device connected to the processor and responsive to operator input for providing information to the processor; and a battery temperature circuit providing a battery temperature signal indicative of a temperature of the battery, said battery temperature circuit connected to the processor, wherein the processor is configured to energize the electric motor to drive the pump mechanism to dispense lubricant at the outlet of the pump mechanism only when the battery temperature signal indicates that the temperature of the battery is below a maximum temperature; and wherein the input device comprises one or more keys, wherein the processor is programmable by the operator via the one or more keys with information indicative of the initial volume of lubricant in the cartridge when the cartridge is installed by the operator.

2. The device of claim 1 wherein the sensor monitors operation of the pump mechanism to indicate a volume of lubricant dispensed by the pump mechanism and wherein the processor controls the display to indicate the volume of lubricant dispensed by the pump mechanism.

3. The device of claim 2 further comprising a magnet on a moving member of the pump mechanism, wherein the sensor comprises a Hall sensor on the pump mechanism for sensing the magnet and providing a Hall signal indicative of movement of the pump mechanism, wherein the condition signal comprises the Hall signal, and wherein the processor controls the display so that the visual image indicates to the operator the volume of lubricant dispensed by the pump mechanism.

4. The device of claim 1 wherein the sensor monitors operation of the pump mechanism to indicate a volume of lubricant dispensed by the pump mechanism, and wherein the processor controls the display so the visual image indicates to the operator the volume of lubricant remaining in the cartridge after lubricant is dispensed by the pump mechanism.

5. The device of claim 4 further comprising a magnet on a moving member of the pump mechanism, wherein the sensor comprises a Hall sensor on the pump mechanism for sensing the magnet and providing a Hall signal indicative of movement of the pump mechanism, and wherein the condition signal comprises the Hall signal.

6. The device of claim 1 further comprising a battery voltage circuit providing a battery voltage signal indicative of a voltage of the battery, said battery voltage circuit connected to the processor, and wherein the processor is configured to energize the electric motor to drive the pump mechanism to dispense lubricant at the outlet of the pump mechanism only when the battery voltage signal indicates that the voltage of the battery is above a minimum voltage.

7. The device of claim 6 further comprising an LED (light emitting diode) on the housing for illuminating a lubrication point, said LED selectively energized by the processor via an electronic switch.

8. The device of claim 7 further comprising a thermal protection circuit connected to an input to the processor for sensing the temperature of the motor; wherein, in the event of excessive resistance of the pump mechanism causing the motor to increase in temperature above a preset temperature, the circuit provides a shutdown signal to the processor; and wherein the processor in response to the shutdown signal disables operation of the motor for a preset period of time and/or until the operator resets the processor.

9. The device of claim 1 further comprising:
a battery voltage circuit providing a battery voltage signal indicative of a voltage of the battery, said battery voltage circuit connected to the processor, and wherein the processor is configured to energize the electric motor to drive the pump mechanism to dispense lubricant at the outlet of the pump mechanism only when the battery voltage signal indicates that the voltage of the battery is above a minimum voltage.

10. The device of claim 1 further comprising a light source on the housing for illuminating a lubrication point, said lights source selectively energized by the processor via an electronic switch.

11. The device of claim 1 further comprising a thermal protection circuit connected to an input to the processor for sensing the temperature of the motor; wherein, in the event of excessive resistance of the pump mechanism causing the motor to increase in temperature above a preset temperature, the circuit provides a shutdown signal to the processor; and wherein the processor in response to the shutdown signal disables operation of the motor for a preset period of time and/or until the operator resets the processor.

12. The device of claim 1 wherein the display is configured to indicate a desired amount of lubricant to be dispensed, wherein the processor energizes the electric motor and decrements the display to reflect the volume of lubricant being dispensed and wherein the processor discontinues energizing the motor when the desired amount of grease has been dispensed.

13. A grease gun for use with a battery and a cartridge of lubricant, said device for dispensing the lubricant in the cartridge at a lubrication point, said device comprising:
a handheld housing enclosing the following in a unitary structure:
a pump mechanism configured for communication with the lubricant in the cartridge and having a supply port for dispensing the lubricant at the lubrication point;
an electric motor for driving the pump mechanism to dispense the lubricant;
a power supply for connection to the battery;
a magnet on a moving member of the pump mechanism;
a Hall sensor on the pump mechanism configured to monitor operation of the pump mechanism for sensing the magnet and generating a Hall signal indicative of a volume of lubricant dispensed by the pump mechanism;
a display configured to display information indicative of the volume of lubricant dispensed by the pump mechanism;
a processor responsive to operator input for controlling the power supply to selectively energize the electric motor to drive the pump mechanism to dispense lubricant at the outlet of the pump mechanism, said processor connected to the display, said processor connected to the sensor for receiving the conditional signal and responsive to the Hall signal for selectively energizing the electric motor and for controlling the display to provide a visual image to the operator corresponding to the Hall signal, wherein the processor controls the display to indicate the volume of lubricant dispensed by the pump mechanism;
an input device connected to the processor and responsive to operator input for providing information to the processor; and
a battery temperature circuit providing a battery temperature signal indicative of a temperature of the battery, said battery temperature circuit connected to the processor, wherein the processor is configured to energize the electric motor to drive the pump mechanism to dispense lubricant at the outlet of the pump mechanism only when the battery temperature signal indicates that the temperature of the battery is below a maximum temperature; and
wherein the input device comprises one or more keys, wherein the processor is programmable by the operator via the one or more keys with information indicative of the initial volume of lubricant in the cartridge when the cartridge is installed by the operator.

14. The gun of claim 13 wherein the sensor monitors operation of the pump mechanism to indicate a volume of lubricant dispensed by the pump mechanism, and wherein the processor controls the display so the visual image indicates to the operator the volume of lubricant remaining in the cartridge after lubricant is dispensed by the pump mechanism.

15. The gun of claim 13 further comprising a battery voltage circuit providing a battery voltage signal indicative of a voltage of the battery, said battery voltage circuit connected to the processor, and wherein the processor is configured to energize the electric motor to drive the pump mechanism to dispense lubricant at the outlet of the pump mechanism only when the battery voltage signal indicates that the voltage of the battery is above a minimum voltage.

16. The gun of claim 13 further comprising an LED (light emitting diode) on the housing for illuminating a lubrication point, said LED selectively energized by the processor via an electronic switch.

17. The gun of claim 13 further comprising a thermal protection circuit connected to an input to the processor for sensing the temperature of the motor; wherein, in the event of excessive resistance of the pump mechanism causing the motor to increase in temperature above a preset temperature, the circuit provides a shutdown signal to the processor; and wherein the processor in response to the shutdown signal disables operation of the motor for a preset period of time and/or until the operator resets the processor.

18. The device of claim 13 wherein the display is configured to indicate a desired amount of lubricant to be dispensed, wherein the processor energizes the electric motor and decrements the display to reflect the volume of lubricant being dispensed and wherein the processor discontinues energizing the motor when the desired amount of grease has been dispensed.

19. The device of claim 13 wherein the display includes a red light source configured to backlight the display and wherein the processor is configured to energize the red light source in the event of at least one of the following: a battery voltage below a minimum, a battery temperature above a maximum and a motor temperature above a maximum.

20. A device for use with a battery and a cartridge of lubricant, said device for dispensing the lubricant in the cartridge at a lubrication point, said device comprising:
a handheld housing enclosing the following in a unitary structure:
a pump mechanism configured for communication with the lubricant in the cartridge and having a supply port for dispensing the lubricant at the lubrication point;
an electric motor for driving the pump mechanism to dispense the lubricant;
a power supply for connection to the battery;
a sensor configured to monitor at least one of the pump mechanism and the electric motor, said sensor generating a condition signal indicative of the operation of the monitored pump mechanism and/or the monitored electric motor;
a display configured to display information indicative of the monitored condition of the device;

a processor responsive to operator input for controlling the power supply to selectively energize the electric motor to drive the pump mechanism to dispense lubricant at the outlet of the pump mechanism, said processor connected to the display, said processor connected to the sensor for receiving the conditional signal and responsive to the condition signal for selectively energizing the electric motor and for controlling the display to provide a visual image to the operator corresponding to the condition signal; and an input device connected to the processor and responsive to operator input for providing information to the processor indicative of the lubricant in the cartridge during use wherein the input device comprises one or more keys, wherein the processor is programmable by the operator via the one or more keys with information indicative of the initial volume of lubricant in the cartridge when the cartridge is installed by the operator.

* * * * *